Figure 1:
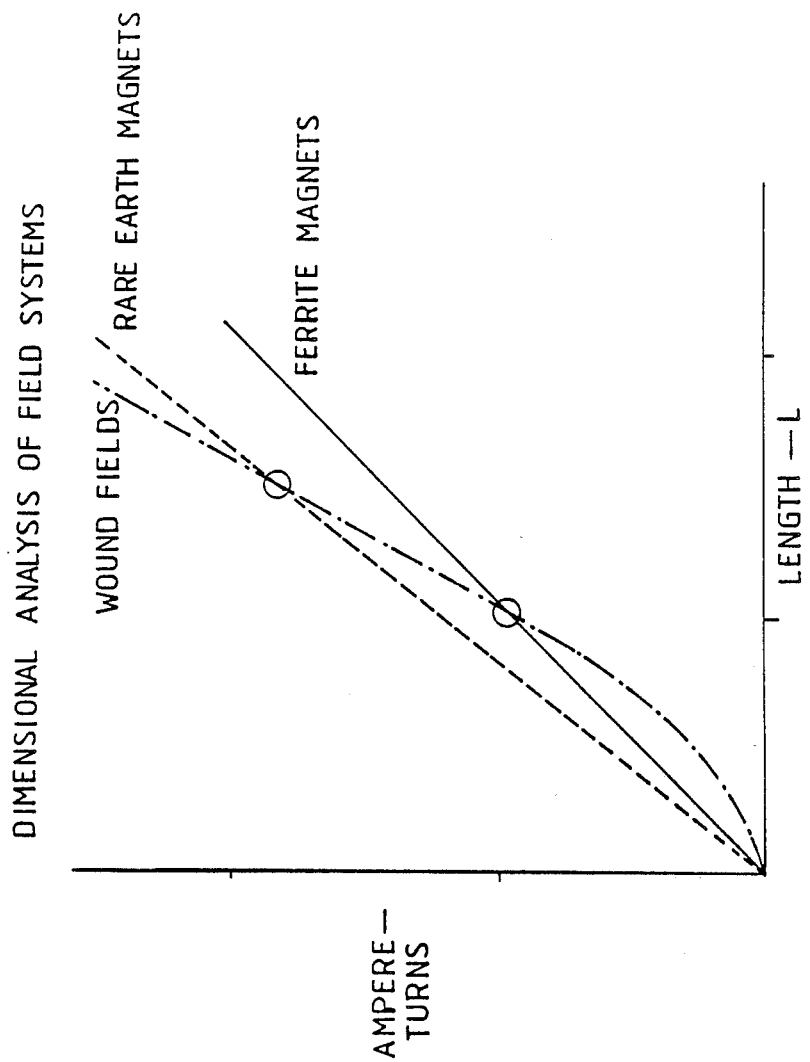

United States Patent [19]

West

[11] Patent Number: 4,899,074
[45] Date of Patent: Feb. 6, 1990

[54] PERMANENT MAGNET ROTARY DYNAMO ELECTRIC MACHINES

[75] Inventor: John G. W. West, Pershore, United Kingdom

[73] Assignee: Magneti Marelli Electrical Limited, Birmingham, England

[21] Appl. No.: 255,946

[22] Filed: Oct. 11, 1988

[30] Foreign Application Priority Data

Oct. 13, 1987 [GB] United Kingdom ............... 8724000

[51] Int. Cl.$^4$ ............................................. H02K 1/08
[52] U.S. Cl. ..................................... 310/154; 310/190
[58] Field of Search ............... 310/154, 190, 191, 192, 310/193, 254

[56] References Cited

U.S. PATENT DOCUMENTS

| | | | |
|---|---|---|---|
| 3,581,374 | 6/1971 | Phelon | 310/271 |
| 4,508,988 | 4/1985 | Reiss et al. | 310/154 |
| 4,587,449 | 5/1986 | West | 310/154 |

Primary Examiner—Patrick R. Salce
Assistant Examiner—Judson H. Jones
Attorney, Agent, or Firm—Nixon & Vanderhye

[57] ABSTRACT

A rotary dynamo electric machine comprising a stator, a rotor rotatable relative to the stator and having an air gap between the rotor and the stator. The permanent magnet poles of the machine each include a two part flux shunt formed from a material of high saturation flux density, each first portion extending from the back iron, towards the air gap of the machine and being magnetically continuous with the back iron, each first portion being adjacent that end of its respective permanent magnet which is the strong tip end in use. Each shunt second portion extending from the respective shunt first portion circumferentially of the machine towards that end of the respective permanent magnet which is the weak tip end in use, and engaging the air gap face of the respective permanent magnet each second portion in that region thereof which is engaged with the respective permanent magnet being shaped such that its cross-sectional area increases substantially linearly from a minimum at its free end. Each shunt first portion having a minimum cross sectional area equal to or greater than the maximum cross sectional area of the respective second portion.

23 Claims, 11 Drawing Sheets

EFFECT OF MAGNETIC SHUNT ON MOTOR PERFORMANCE

PERMANENT MAGNET ROTARY DYNAMO ELECTRIC MACHINES

This invention relates to unidirectional permanent magnet, direct current, rotary dynamo electric machines, and while the invention is primarily directed to d.c., permanent magnet electric motors it is to be recognised that the invention is applicable also to dynamos. Although in theory the invention is applicable to permanent magnet machines irrespective of their size, it is probable that in practical terms the major benefits of the invention will be seen in that class of machines designed for automobile applications, particularly but not exclusively starter motors and dynamos for use in association with internal combustion engines.

Since a major application of the invention lies in the field of automobile internal combustion engine starter motors it is convenient to use such motors as the basis for the following discussion of the theory underlying the invention, but it is to be recognised that the invention is not exclusively concerned with such motors.

Conventional starter motors for automobile internal combustion engines, both petrol engines and diesel engines, have for many years utilized a stator carrying a series wound field winding within which a wound armature rotates, the current flowing in the armature windings being switched by way of a commutator rotating with the armature and brushes engaging the commutator and carried by the stator.

It has long been recognised that the substitution of a permanent magnet field assembly for the wound field assembly would provide the advantages of simplicity, reduced cost, and greater reliability owing to the elimination of the field windings. However, comparing a series wound field motor with a permanent magnet motor of equivalent size reveals that the permanent magnet motor has an operating characteristic which differs from that of the series wound field motor and which is not so well suited to use as a starter motor. In particular the series wound motor provides a higher stall torque (sometimes known as lock torque) which is advantageous in providing adequate engine starting torque in cold starting conditions and which is also needed in certain hot starting conditions for example where the engine exhibits increased friction owing to hot oil draining from rubbing surfaces of the engine, and where preignition occurs. Additionally the series wound motor has a higher light load armature speed than an equivalent permanent magnet motor. This feature is important in those situations where, having overcome the stall torque situation and the engine is being cranked, a particular cranking speed is necessary to drive the engine to pass through a running speed at which partial engine firing occurs and to achieve a speed at which self-sustaining running can occur. Such situations arise mainly with diesel engines but can occur with petrol engines, notably fuel injected petrol engines, in hot conditions where vaporization of fuel in the engine fuel lines can occur.

In permanent magnet machines there is of course an air gap between the rotor and the stator, and the magnetic field of each permanent magnet pole coacts in use with the magnetic field of the wound poles during relative movement of the wound and permanent magnet poles, the field of wound poles being generated by electric current flowing in the associated winding conductor. In a motor the current flow generates the relative movement between the stator and the rotor whereas in a generator relative motion between the rotor and the stator generates the current flow. The interaction of the two magnetic fields gives rise to a well understood phenomenon known as "armature reaction". The effect of armature reaction is to increase the magnetic flux density towards one tip of the permanent magnet pole at the expense of decreasing the flux density towards the opposite tip of the permanent magnetic pole. The tips of the permanent magnet poles referred to in the preceding sentence are the opposite end regions of the pole in relation to the direction of relative rotation of the rotor and stator and are normally referred to as the leading and trailing tips respectively of the pole. However, armature reaction in a d.c. motor increases the flux density towards the leading tip, whereas in an equivalent generator the flux density is increased towards the trailing tip. Since the present application is concerned with both generators and motors it is more convenient to refer to the permanent magnet poles as having, as a result of armature reaction, a strong tip (the end region of the permanent magnet pole at which the armature reaction gives rise to an increased flux density) and a weak tip (the end region of the permanent magnet pole at which armature reaction gives rise to a decreased flux density).

Permanent magnet electric motors operating on direct current (d.c.), either rectified a.c. (alternating current) or pure d.c., are known to exhibit an operating characteristic intermediate those of conventional shunt and series wound field electric motor. Thus as mentioned above a permanent magnet motor can be expected to have a lower rotational speed under low load conditions and to have a lower torque at stall than a comparable conventional series wound field motor.

Our British Patent No. 2130810B discloses a permanent magnet machine modification which tailors the machine characteristics to approach those of a series wound machine. This change in machine characteristics is achieved by the use of a flux shunt associated with each of the permanent magnet poles. The same general concept forms the basis of the present invention.

The flux shunt disclosed in 2130810B comprises a shield of material of high saturation flux density engaging the air gap face of the strong tip region of the pole and also engaging the part of the iron circuit of the machine upon which the permanent magnet pole is supported so as to provide a direct flux path between the air gap at the strong tip region of the pole and the iron circuit, said direct flux path being arranged to shunt magnet flux to the iron circuit when the current in the associated winding is low, but to be saturated at high values of winding current.

Considering a d.c. permanet magnet motor, then at low armature currents each flux shunt provides a direct path diverting armature flux from the air gap to the yoke. Thus in low load conditions where the current flowing in the wound armature is low the shunting of flux to the yoke results in increased armature speed at low torque. At low armature currents therefore each shunt "shorts out" that part of its respective magnet which lies beneath the part of the shunt which engages the air gap face of the magnet.

At high armature currents (stall conditions) each flux shunt saturates and in effect the flux flow reverses giving increased flux in the shunt regions of the air gap and so increasing the available torque at stall. It can be seen therefore that the effect of the shunts is to modify the permanent magnet machine characteristics to approach those of a series wound field machine.

The flux shunt arrangements disclosed in 2130810B although providing a desirable change in the permanent magnet machine characteristics do not, notably in the case of a d.c. motor for use as a starter motor, provide ideal characteristics and it is an object of the present invention to provide a permanent magnet rotary dynamo electric machine wherein a further improvement in the operating characteristics can be realized.

In accordance with the present invention there is provided a unidirectional, permanent magnet, direct current, rotary dynamo electric machine comprising a stator, a rotor rotatable relative to the stator and having an air gap between the rotor and the stator, the permanent magnet poles of the machine each including a flux shunt comprising first and second magnetically continuous portions formed from a material of high saturation flux density, each first portion extending from the back iron upon which its respective pole is mounted towards the air gap of the machine and being magnetically continuous with said back iron, each first portion being adjacent that end of its respective permanent magnet which is the strong tip end in use and having its end remote from the back iron magnetically continuous with the respective shunt second portion, each second portion extending from the respective shunt first portion circumferentially of the machine towards that end of the respective permanent magnet which is the weak tip end in use, and engaging the air gap face of the respective permanent magnet, each second portion in that region thereof which is engaged with the respective permanent magnet, being shaped such that its cross-sectional area increases substantially linearly from a minimum at its free end, and each shunt first portion having a minimum cross sectional area equal to or greater than the maximum cross sectional area of the respective second portion, and each shunt extending over a maximum of 80% of the pole arc of its respective pole from the strongtip end thereof.

It will be understood that the permanent magnet poles may be part of the stator or the rotor of the machine. Where the machine is an internal combustion engine starter motor it is preferred that the permanent magnets are part of the stator which in turn encircles the rotor.

Preferably the permanent magnet material of the poles is ferrite material or a rare earth iron material and the shunt second portions are inset in the airgap face of their respective permanent magnets.

The term inset is used to indicate that by comparison with an equivalent pole without a shunt ferrite material is removed or omitted to accomodate the respective shunt second portion.

Alternatively the permanent magnet material is a rare earth iron material and the respective shunt second portions are seated on the airgap faces of the permanent magnets.

The term "magnetically continuous" is used herein to denote an arrangement of parts wherein magnetic flux can flow from one to the other of the part substantially unimpeded by the nature of the interconnection of the two parts. Thus two parts integral with one another or cleanly welded to one another or in good surface to surface abutment, would be "magnetically continuous". Two parts separated by an air-gap would not be "magnetically continuous" unless the air-gap was very small in relation to the flux density such that only a proportionally very small loss occured as a result of the airgap.

Conveniently the shunt second portions have a reduced axial dimension by comparison with the respective shunt first portions.

Desirably the circumferential dimension and the positioning of the permanent magnet of each pole is such in relation to the overall pole arc that a gap is defined between the first portion of each shunt and the adjacent end of the respective permanent magnet.

Preferably the poles are carried by the stator and a, or each, through bolt of the machine is accomodated in said gap of a respective pole. Conveniently the respective shunt first portion is bifurcated to accept the through bolt.

Desirably the circumferential dimension of the permanent magnet of each pole together with the thickness of the respective shunt first portion is less than the required pole arc and the shunt has an extension extending in the opposite circumferential direction to the shunt second portion to provide the required pole arc.

Preferably the stator carries the permanent magnet poles, the rotor has a wound armature and the taper of the second portions of the shunts is such that when no current flows in the windings of the armature, the flux density within the shunt second portions, over substantially the whole of each pole arc, is at or near the "knee" of the saturation curve of the shunt material.

Conveniently the poles are retained in position relative to the back iron by means of a metal tube lying in the airgap between the rotor and the stator.

Alternatively the poles are retained in position relative to the back iron by means of spring clips received in the interpolar spaces.

Conveniently where the permanent magnet material is a rare earth iron material the permanent magnets of the poles are supported on radial platforms. Desirably the platforms and the shunts are integral parts of a common ferromagnetic member.

Figure 2:
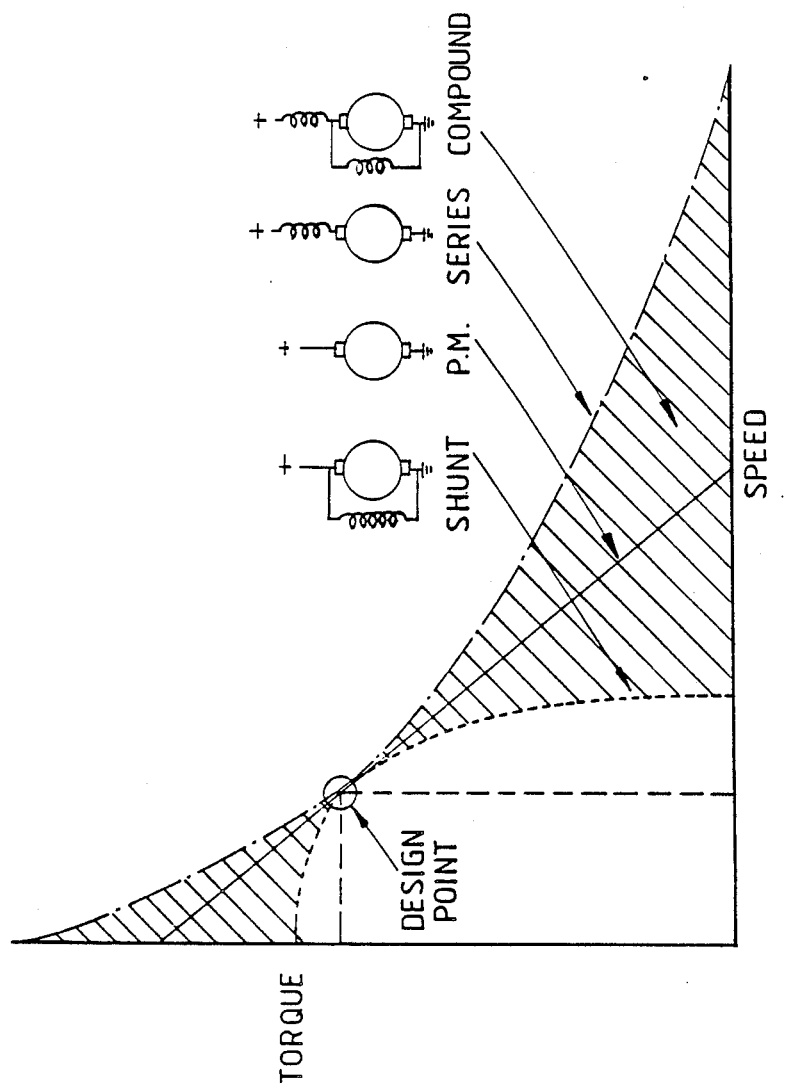
Figure 3:
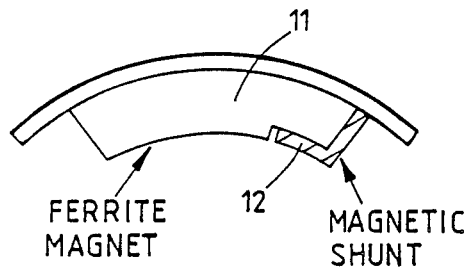
Figure 4:
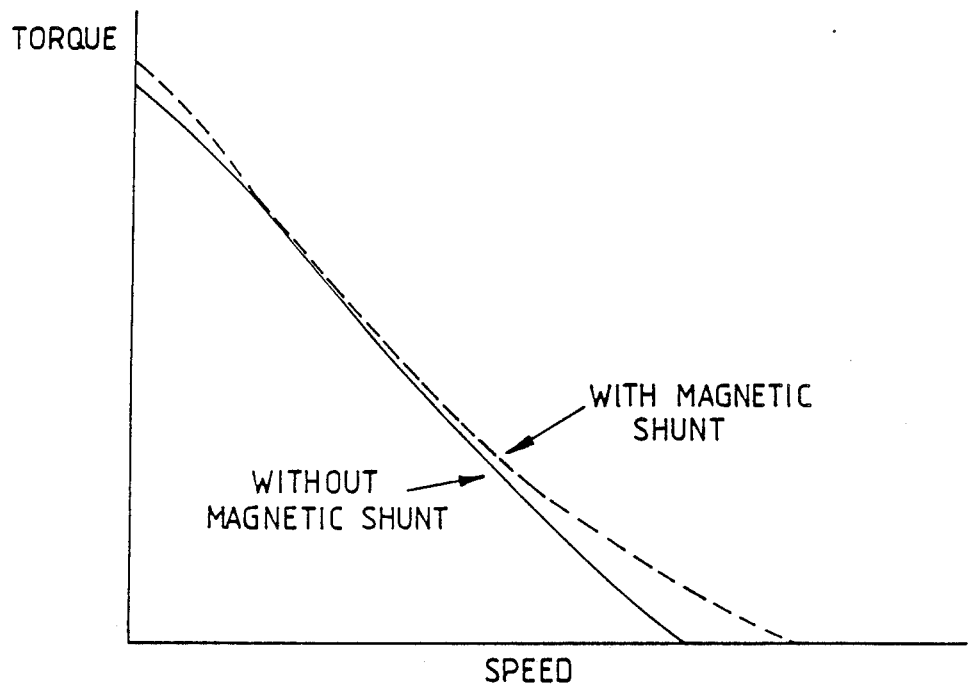
Figure 5:
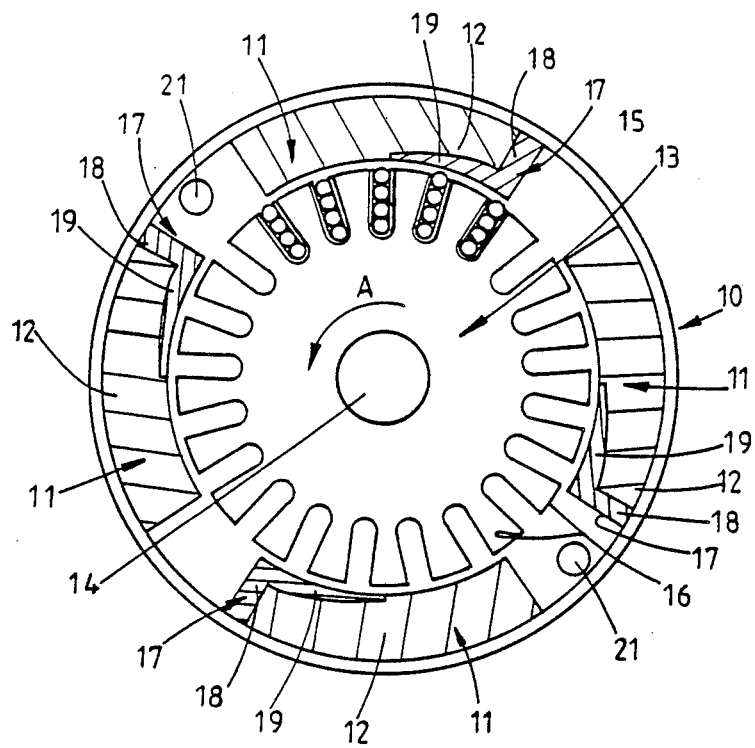
Figure 6:
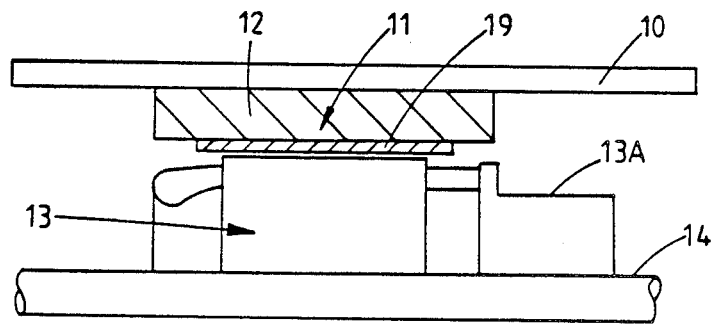
Figure 7:
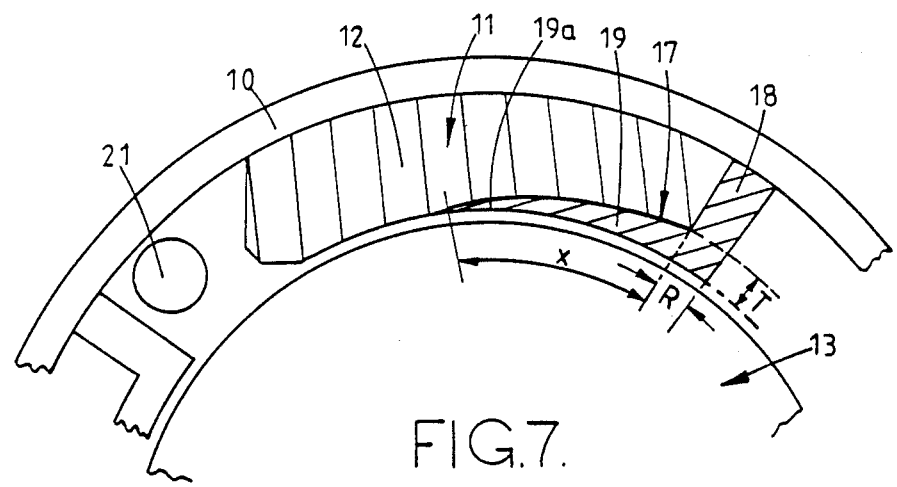
Figure 7A:
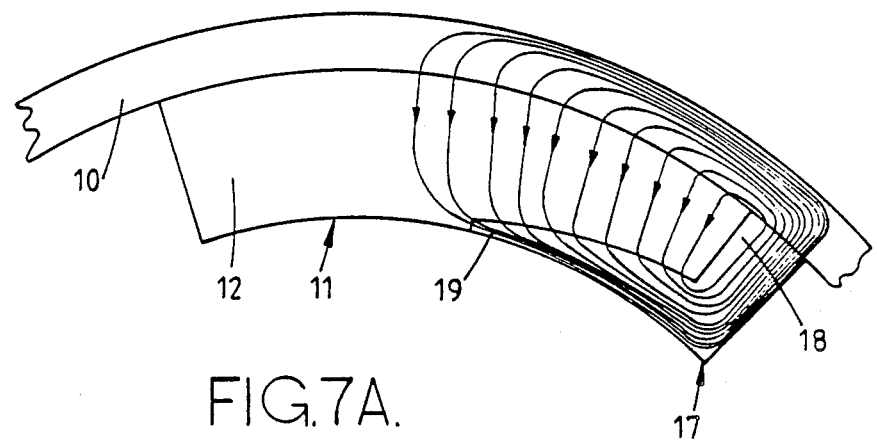
Figure 8:
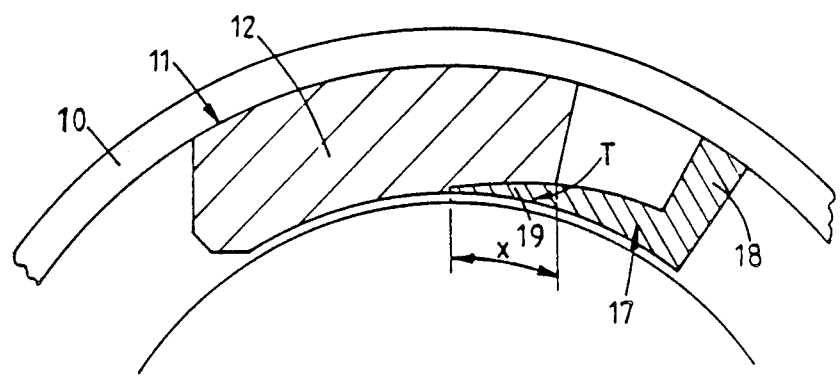
Figure 9:
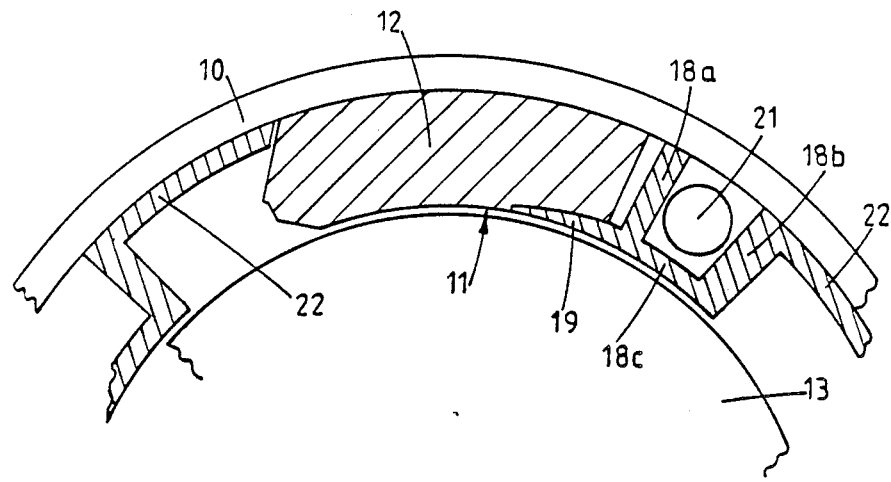
Figure 10:
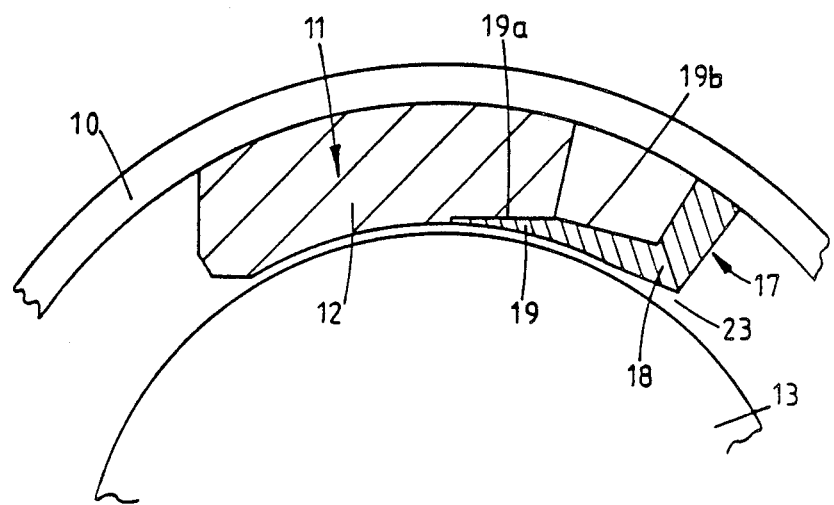
Figure 11:
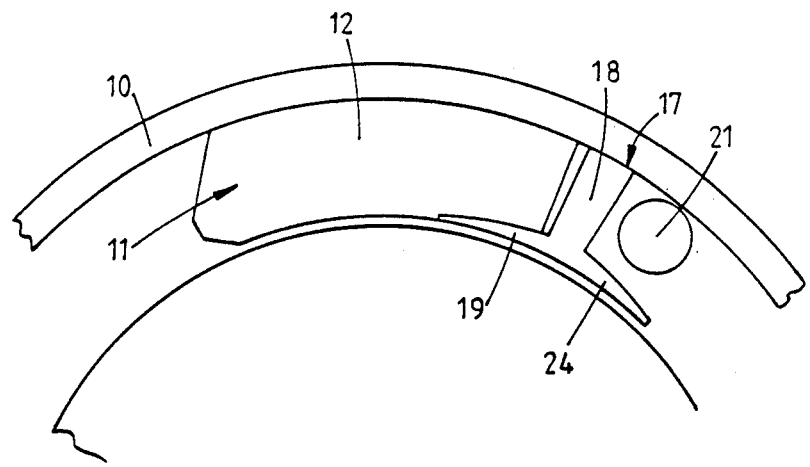
Figure 12:
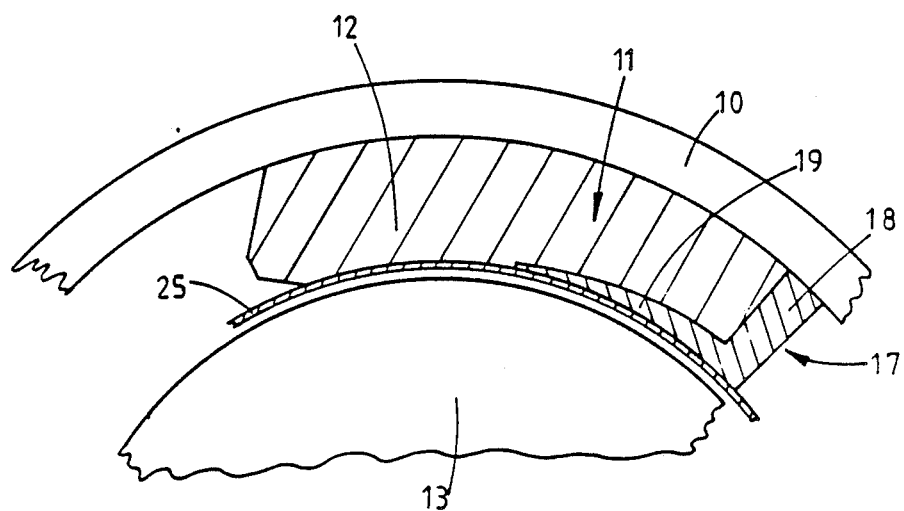
Figure 13:
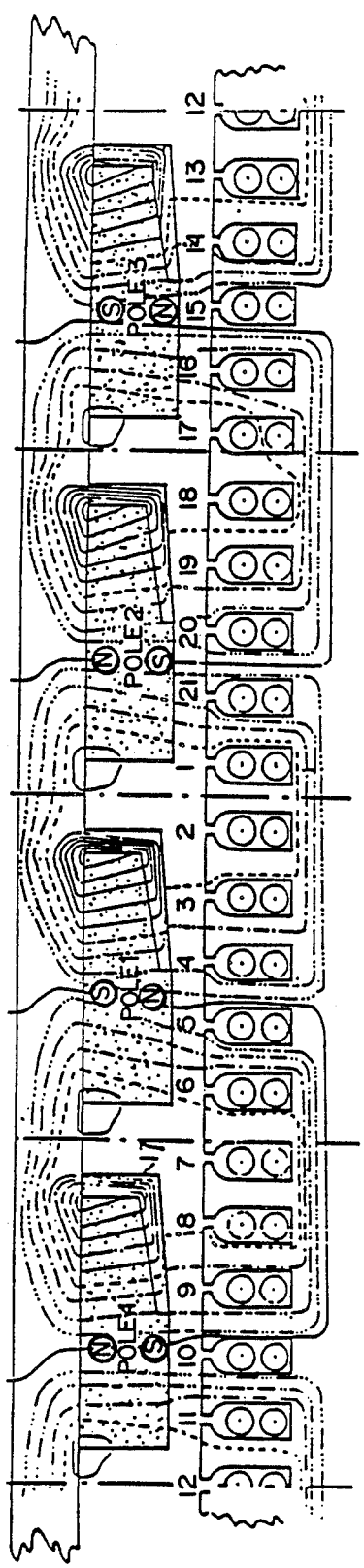
Figure 14:
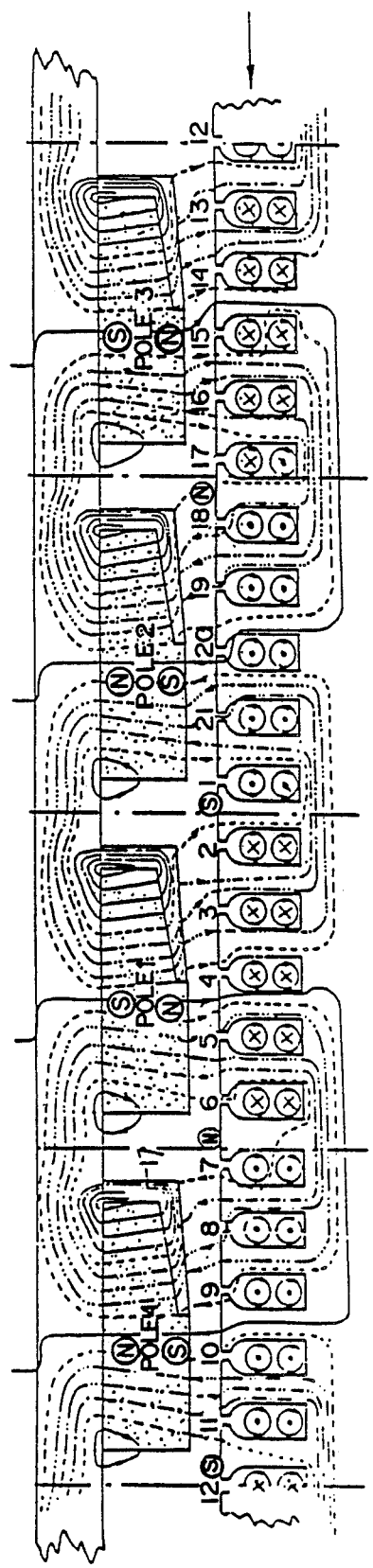
Figure 15:
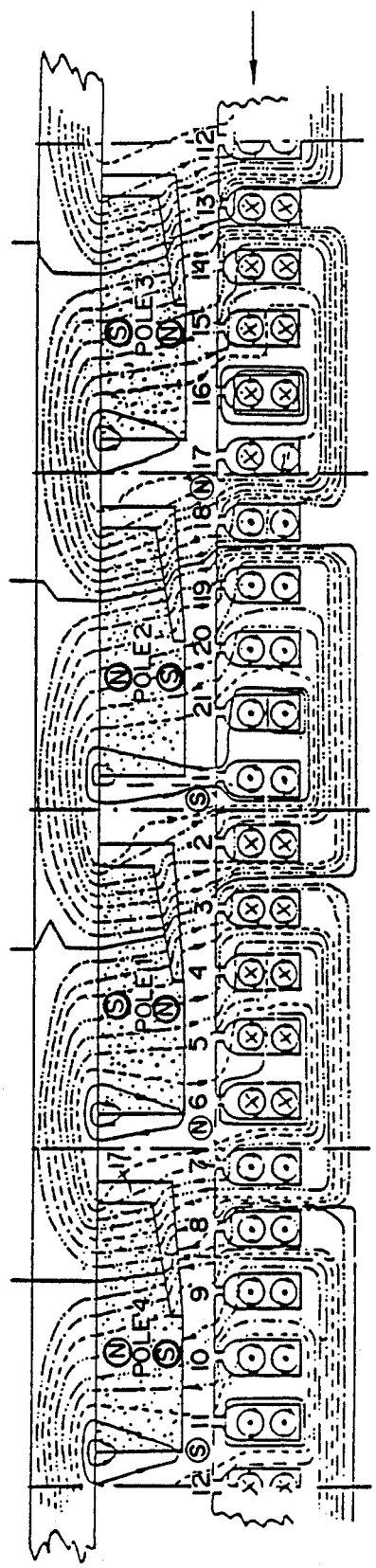
Figure 16:
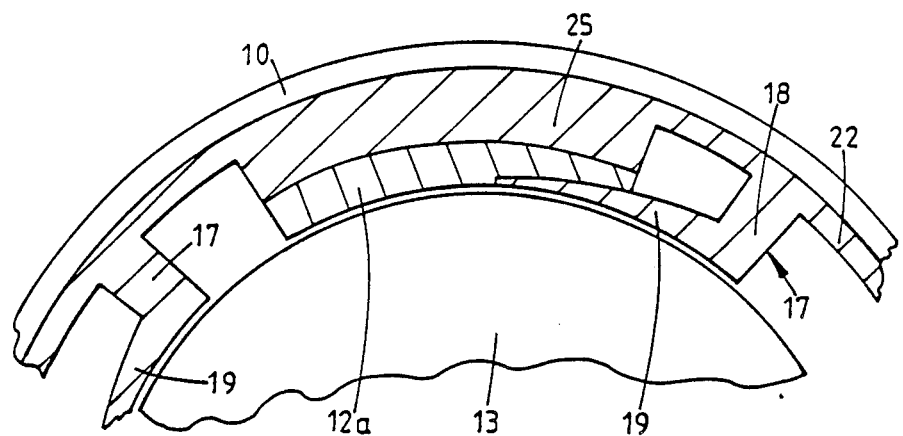

In the accompanying drawings,

FIG. 1 is a graphic representation of a dimensional analysis of alternative field systems for d.c. electric motors, FIG. 2 is a graphic representation of the torque/speed characteristics of d.c. motors having different field configurations, FIG. 3 is a diagrammatic representation of a permanent magnet pole of a d.c. motor embodying a flux shunt, FIG. 4 is a graphic representation of the torque/speed characteristic of a motor embodying poles as illustrated in FIG. 3 compared with an equivalent motor where the poles do not have flux shunts, FIG. 5 is a diagrammatic, transverse cross sectional view of a four pole d.c. permanent magnet motor in accordance with a first example of the present invention, FIG. 6 is diagrammatic longitudinal sectional view of part of a motor similar to that of FIG. 5 but not in scale therewith, FIGS. 7 and 7A are enlarged views illustrating one of the poles seen in FIG. 5, FIG. 8 is a view similar to FIG. 7 of a modification, FIG. 9 is a view similar to FIG. 8 of a second modification, FIG. 10 is a view similar to FIG. 7 of a third modification, FIG. 11 is a view similar to FIG. 9 illustrating a modification thereof, FIG. 12 is a view similar to FIG. 7 but illustrating a tapering air gap, FIGS. 13, 14 and 15 are developed view illustrating the flux flow in a machine of the kind described with reference to FIG. 12, in low load, median load, and high load operating conditions respectively, and FIG. 16 is a view similar to FIG. 7 but illustrating a modification wherein a high energy content permanent magnet material is utilized in the permanent magnet poles.

Figure 17:
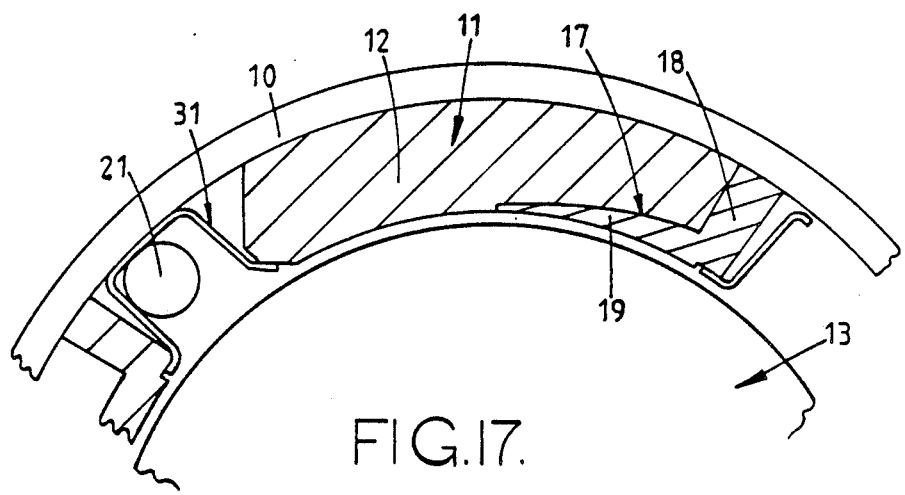
Figure 18:
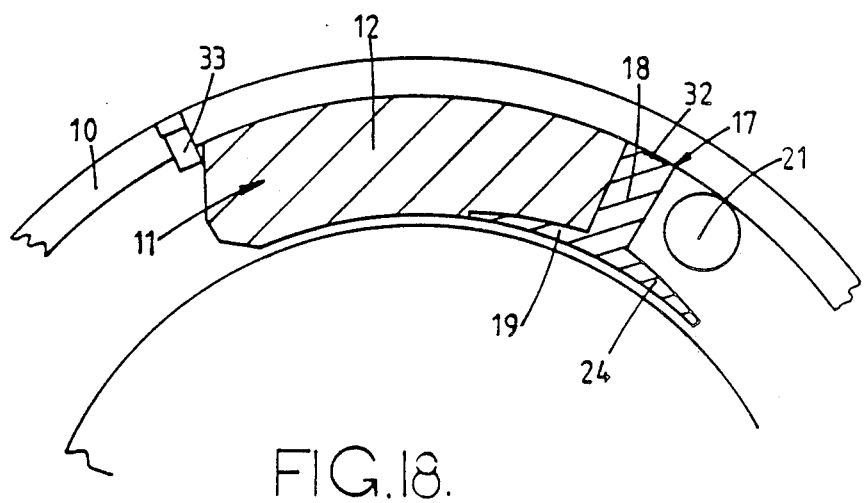
Figure 19:
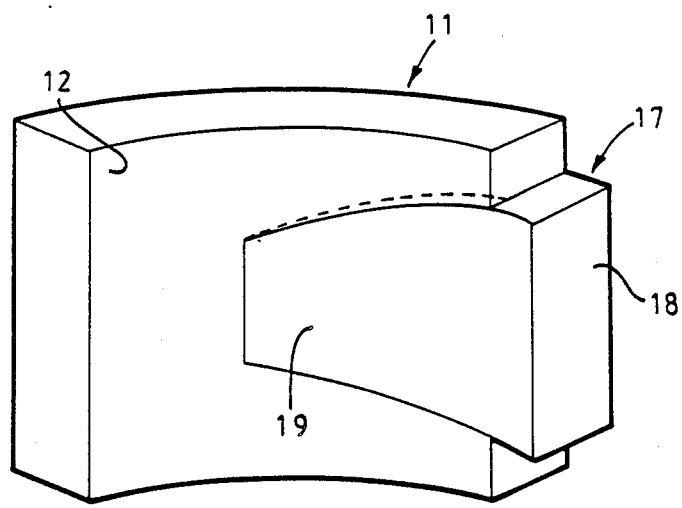
Figure 20:
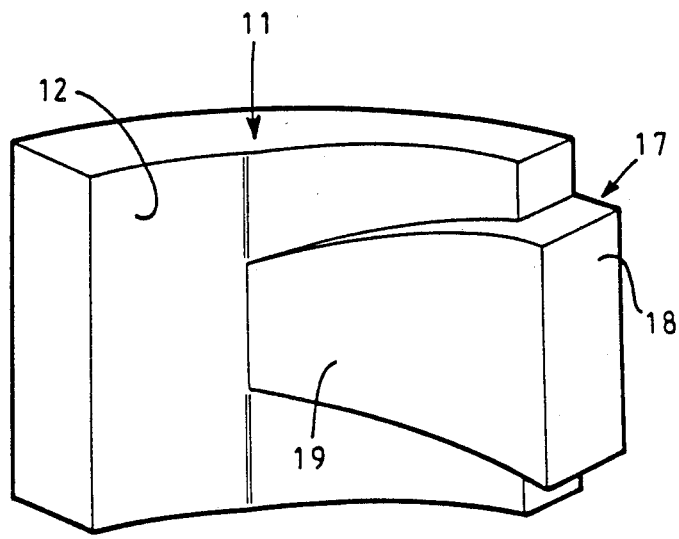

FIG. 17 is a view similar to FIG. 7 but illustrating an example of a pole securing arrangement, FIG. 18 is a view similar to FIG. 11 also illustrating an example of a pole securing arrangement, FIG. 19 is a diagrammatic perspective view of a pole illustrating a tapering insert shunt, and FIG. 20 is a view similar to FIG. 19 illustrating an alternative insetting of the shunt.

Before describing preferred embodiments of the invention and modifications thereto it is convenient to discuss the background and theory underlying the invention. As mentioned previously the invention is applicable to a wide range of permanent magnet, rotary, dynamo electric machines but it is believed that the invention can be best understood with reference to permanent magnet d.c. motors, conveniently starter motors for use with automotive internal combustion engines, both diesel engines and petrol engines.

Wound field d.c. motors are well known, and can be considered broadly in three categories, series wound motors, shunt wound motors, and compound wound motors. Compound wound motors although affording flexibility in the design of their operating characteristics, suffer from a high level of complexity, and thus can be dismissed from consideration when seeking to achieve motors embodying simplicity, high reliability, and low cost. Shunt wound motors exhibit relatively low torque in stall conditions, and relatively low armature rotational speed in low load conditions. Thus shunt wound motors are totally unsuitable for use as internal combustion engine starter motors. Series wound motors exhibit high stall torque and high low load armature rotational speeds, and thus are well suited to use as internal combustion engine starter motors. However, it is well recognised that permanent magnet, d.c. motors have the advantages of simplicity, higher reliability, and lower cost over series wound motors, and thus particularly in the field of automotive starter motors there is considerable interest in applying permanent magnet motor technology.

FIG. 1 illustrates a dimensional analysis of wound field motors, and permanent magnet motors employing rare earth magnets, and those employing ferrite magnets. There is of course a fundamental relationship between the size of the field system of a motor, and the field strength (the number of ampere-turns) that the field system can provide. FIG. 1 indicates that up to a predetermined size (indicated by length-L in FIG. 1) a permanent magnet field provides higher excitation per unit size than a wound field. The point at which the wound field curve (chain dotted in FIG. 1) and the ferrite magnet curve (solid line in FIG. 1) cross is indicated at L1 and for greater sizes it follows that the wound field provides higher excitation. However, naturally the degree of excitation depends on the energy content of the permanent magnet and it can be seen from FIG. 1 that rare earth magnets, which of course exhibit a higher energy content than ferrite magnets provide superior excitation than a wound field up to a larger machine size.

When considering starter motors for automotive use machines up to 80 mm diameter can be produced using ferrite permanent magnets while retaining the superior excitation over an equivalent sized wound field machine. However beyond 80 mm diameter wound field machines begin to provide significant advantages over ferrite magnet machines.

It is clear therefore that it is attractive to use permanent magnet fields in automotive starter motors but as is clear from FIG. 2 there is a major difference in operating characteristics between a permanent magnet motor and an equivalent sized series wound field motor. In FIG. 2 the torque output is plotted against the rotational speed of the armature and it can be seen that for a shunt wound motor (broken line) the stall torque is low and the low load running speed is also low. Conversely, the series wound motor (chain dotted line) has high stall torque and high speed at low load whereas the permanent magnet motor (solid line) falls between the two. Of the three characteristics the series wound field motor has the desired characteristic for use as an automotive starter motor since the higher stall torque is advantageous in providing adequate "breakaway" and "compression" torque for cranking a cold engine. There is also a starting condition known as "hot stall" which occurs with certain engine designs and results from high engine friction arising from oil draining from the rubbing surfaces of the engine when the engine is hot. This condition can also combine with pre-ignition to give a starting situation in which a high torque output of the starter motor is needed. At the opposite end of the performance range a high armature speed at low load operating conditions is desirable in order to overcome two particular starting conditions which can occur. Firstly, where the engine is a diesel engine, once the cranking procedure has commenced, and a first firing of the engine has occurred then unless the starter motor can assist the engine to reach a cranking speed of about 300 to 400 rpm then although the engine is firing it may not develop sufficient power to overcome its own internal resistance, and thus will not reach a stage where its operation is self sustaining. A similar situation can occur with a petrol engine, particularly a fuel injected petrol engine where it may be necessary to crank a hot engine at relatively high speed in order to overcome a "vapour lock" condition in the fuel lines or fuel injectors of the engine. It will be recognised therefore that in order to be able, satisfactorily to use a permanent magnet motor as a starter motor its operating characteristics should approach, as closely as possible, those of an equivalent series wound motor.

FIG. 3 illustrates a permanent magnet motor modification as disclosed in our British patent 2130810B wherein a magnetic shunt 12 is applied to each ferrite magnet pole 11 of the motor. FIG. 4 shows the modification in the operating characteristic which is provided by the inclusion of the shunts 12. In FIG. 4 the solid line illustrates the characteristic of the motor without shunts 12 and the broken line illustrates the characteristic of an equivalent motor fitted with shunts 12, and it can be seen that the effect of the shunts is to raise the stall torque, and also to raise the armature speed in low load conditions. The intention of the modification described in 2130810 is to produce a permanent magnet starter motor suitable for use as a geared starter motor, that is to say a starter motor wherein a reduction gearing is employed within the starter motor between the armature and the starter motor pinion. In a geared permanent magnet starter motor without shunts the stall torque may still be adequate to effect initial cranking of engines in that it will be able to overcome the initital resistance to rotation of the engine. However, the deficiency in low load running speed will be a more serious problem in that a geared permanent magnet motor without shunts would probably not be able to accommodate the high cranking speed conditions mentioned above. It can be seen from FIG. 4 that the provision of shunts 12 although effecting a marginal increase in stall torque provides a much more marked increase in low load running speed, and thus in general terms the arrangement disclosed in 2130810B is more suitable for use with geared permanent magnet starter motors than with direct drive permanent magnet starter motors.

Recent investigations have indicated that the arrangement disclosed in 2130810B does not achieve optimum torque/speed characteristics. Such optimum torque/speed characteristics may be classified, in general terms, as (a) adequate stall torque to accommodate cranking of a cold engine, and also to accommodate the "hot stall" condition, (b) stall torque which is not excessive thus minimising the impact torque to which the mechanical components of the starter motor are subjected, and, (c) higher speeds at low torque thereby minimising hot starting delay, or the problem mentioned above in relation to diesel engines and fuel injected engines, which problem is normally known as "hanging on the starter".

Turning now to the embodiments of the present invention, reference is made firstly to FIG. 5 which is a diagrammatic cross sectional representation of a four-pole d.c. permanent magnet motor. The motor includes a cylindrical mild steel yoke 10 to the inner cylindrical surface of which are attached four equiangularly spaced permanent magnet poles 11. Each of the poles 11 is curved in transverse cross section to match the curve of the interior of the yoke, and each pole extends axially within the yoke. The four poles are identical.

Disposed within the yoke 10 for rotation therein about the longitudial axis of the yoke is an armature assembly 13 including an armature shaft 14 by way of which the assembly 13 is supported for rotation. As is conventional, the armature body is longitudinally slotted to receive armature winding conductors 15 the regions of the armature body between the slots defining armature teeth or poles 16. Arrow A in FIG. 5 indicates the intended direction of rotation of the armature.

Each of the permanent magnet poles 11 comprises a major portion 12 formed from ferrite permanent magnet material and, at its leading end (considered in relation to the direction of rotation of the armature) a mild steel element 17. It will be recognised therefore that the pole arc of each of the permanent magnet poles 11 includes the extent, in a circumferential direction, of the respective elements 17.

Each of the elements 17 comprises two distinct portions, a first radially extending portion 18 having integral therewith a second, circumferentially extending portion 19. The radially extending portion 18 of each element 17 is, at its radially outermost end, in abutting contact with the yoke 10, and thus is magnetically continuous therewith. Each circumferentially extending portion 19 is magnetically continuous with the radially inner-most end of its respective portion 18 by virtue of being integral therewith.

The radially inwardly presented faces of the four poles define parts of the surface of a common imaginary cylinder coaxial with the yoke 10 and thus the part-cylindrical faces of the poles 11 are parallel to the outer cylindrical face of the armature 13. A radial gap exists between the armature and the pole faces, this gap being the air-gap of the machine. The portions 19 of the elements 17 are inset into the ferrite portions 12 of the poles 11 so that each pole face is a continuous curve.

In the example illustrated in FIGS. 5 and 6 each portion 19 terminates half way around the curve of its respective pole, and thus each pole face, if viewed from the axis of rotation of the armature 13 would be half ferrite material and half mild steel, the ferrite portion being the trailing half of the pole. Moreover, the radial thickness of each portion 19 tapers smoothly from substantially zero at the free end of the portion 19 to a maximum where the portion 19 merges with the portion 18. The circumferential thickness of each portion 18 is not less than the maximum radial thickness of the associated portion 19. Thus not only is the face of each element 17 which is presented to the armature 13 a part-cylindrical surface, but also the surface of each portion 19 presented to its respective ferrite portion 12 is also part-cylindrical, with its axis parallel to, but displaced from the axis of the yoke 10. The actual thicknesses involved will be dependent upon a number of factors, including the overall diameter of the motor, and the number of poles which the motor embodies. For example, a large four pole motor would probably embody elements 17 wherein the maximum radial thickness of the portion 19 is 3 to 4 mm. However, a small six pole motor would embody elements 17 having portions 19 the maximum radial thickness of which is 1 to 2 mm.

It will be recognised that by virtue of "armature reaction" the leading end of each pole 11 is the strong tip of the pole and the trailing end of each pole 11 is the weak tip. Each element 17 defines a flux shunt at the strong tip of its respective pole. The nature of the taper in the radial thickness of the portion 19 of each element 17 is chosen to provide a gradual and linear increase in the thickness of the flux shunt so as to provide a proportionally greater flux carrying capacity progressively towards the strong tip of the pole. This is quite distinct from the arrangements disclosed in 2130810B which do not embody the gradual, and linearly increasing thickness of flux shunt towards the strong tip of the pole. The use of a tapering portion 19 minimises the amount of iron (mild steel) in the air gap region of the machine, maximises the amount of permanent magnet material particularly beneath the free end region of the portion 19 of the shunt and thus minimises the distortion of the flux towards the strong tip of the pole which can occur when significant currents flow in the armature conductors. Such flux distortion can occur in the arrangements illustrated in 2130810B giving rise to high flux densities in the armature teeth and hence less total effective flux for a given armature current. The overall result of such flux distortion is a reduction in power output.

It is stated above that the circumferential thickness of the portion 18 of each element 17 is not less than the maximum radial thickness of the associated portion 19. Where the provision of increased stall torque is not a prime consideration then the circumferential thickness of the portion 18 will be chosen to be equal to, or only slightly greater than, the maximum radial thickness of the corresponding portion 19. However, where the starter motor is intended for use as a direct drive starter motor then there will be a need to maximise the stall torque characteristic of the motor and in those circumstances the circumferential thickness of the portion 18 will be considerably greater than the maximum radial thickness of the portion 19 so that a substantial part, conveniently from 20 to 50%, and preferably from 30 to 35% of the overall pole arc will be defined by the mild steel portion 18 at the strong tip end of the pole. The element 17 may define from 20 to 80% of the pole face arc, the greater the percentage of the arc defined by the portion 19 of the element 17, the greater is the increase in low load armature speed.

At low values of armature current, that is to say in low load conditions, flux from the strong tip regions of the air gap is shunted by the elements 17 directly to the yoke, and thus does not pass across the air gap. The effect of shunting flux in low armature current conditions is to increase the low load running speed which the armature of the motor can achieve. However, as the armature current increases the flux flowing in the shunt saturates the shunt commencing at the free end of the portion 19 and progressing, with increasing current, towards the portion 18 so that the shunt can no longer conduct flux to the yoke, and thereafter with increasing armature current, even through the portion 18 may not itself saturate the flux flow in the element 17 effectively reverses and the element 17 contributes flux to that already flowing across the air-gap thereby increasing the torque of the motor. Thus two separate conditions operate, a low load condition in which armature speed is increased, and a high current situation, for example as will occur at stall, in which the stall torque is increased. The balance between the two can be varied by varying the amount of pole arc defined by the portion 18 of each element 17, and covered by the portion 19, and, for example in a permanent magnet motor intended for use as a geared starter motor the increase in stall torque required will be minimal, and thus each portion 18 will be relatively thin by comparison with a motor intended for use as direct drive starter motor where a large increase in the stall torque is called for and the portion 18 of each element will be correspondingly of greater thickness.

FIG. 7 is an enlarged view of part of FIG. 5 and illustrates certain dimensions of the element 17. Thus the thickness of portion 18, measured in a circumferential direction, is R, the maximum thickness of the portion measured in a radial direction is T and the arcuate length of the portion 19, where overlying permanent magnet material, is x. As stated previously R is equal to or greater than T and the increase in thickness of portion 19 in relation to its length is linear or substantially linear. It is well recognised that the magnetization characteristic of mild steel (the magnetization curve) contains a sharp change in gradient which is usually known as the "knee" of the magnetization curve. If the flux density at the knee of the magnetization curve of the mild steel of the element 17 is $B_K$ and the remanent flux density of the ferrite permanent magnet material 12 is $B_R$ then in order to shunt completely the remanent flux with the minimum amount of iron in portion 19 of each flux shunt element 17 with a linear increase in thickness over arc x it is true to say that $TB_k = xBR$ or $x/T = B_k/BR$ Applying realistic numerical values then $B_K = 18000$ gauss and $B_R = 4000$ gauss and thus $x/T = 4.5$. In other words, for every 4.5 mm of magnet arc covered by the portion 19 of an element 17 the maximum thickness of portion 19 (T) will increase by 1 mm. In a practical arrangement it is more convenient to manufacture the portion 19 with its free end cut-off at 19a (See FIG. 7). Thus portion 19 will not taper to zero but would be cut-off at a minimum thickness of around 0.5 mm. However, since the ferrite magnet behaves in a similar manner to air in that its recoil permeability is approximately 1.05, the magnetic flux will still be gathered into the cut-off tip (as seen in FIG. 7a), and the performance will be virtually unaffected by cutting off the tip.

The dimension "x" is the length of a portion 19 which overlies permanent magnet material and is measured from the real or notional zero thickness end of the portion 19. As will be described in more detail below FIG. 8 shows a pole construction wherein the portion 19 extends beyond the "strong tip" end of its permanent magnet material. The dimensions x and T would be as shown in FIG. 8 and between the permanent magnet material and the portion 18, the portion 19 could be of constant thickness. However, for in some applications it may be preferable to arrange for an increasing thickness in this area of portion 19 either for mechanical reasons (for example ease of manufacture) or to increase the enhancement of lock torque (in those arrangements where dimension R is required to exceed dimension T), or both.

The axial dimension of each element 17 preferably lies between a minimum which is equal to the axial length of the armature 13, and a maximum which is equal to the axial dimension of the permanent magnet material 12. Where the axial dimension of the portion 19 is less than that of the permanent magnet material then the dimension T of the elements 17 should be increased to accommodate the additional flux from the overhanging magnet portions. The amount of the increase in T can be readily calculated with reference to the well known "overhang factors" used when performing data calculations in machines where the poles "overhang" the armature axially.

The permanent magnet poles 11 can be secured to the yoke in any convenient manner. For example, adhesive may be used between the ferrite material 12 and the yoke and the element 17 may be adhesively secured to the ferrite material. Additionally, or alternatively, the free end of the portion 18 may be secured to the yoke by means of one or more small set screws extending through the yoke into the material of the portions 18. As a further alternative, a cylinder of aluminium or similar material may be interposed between the armature 13 and the poles, lying in the air-gap, and trapping the poles against the yoke. Item 21 in FIGS. 5, 6 and 7 represent the through-bolts for securing the end caps of the motor at the opposite axial ends respectively of the yoke 10. It can be seen from FIG. 5 that where a pair of bolts 21 are utilized they pass through diametrically opposite interpolar spaces.

FIG. 8 shows a modification of the arrangement shown in FIG. 7 in which the amount of ferrite material in the portion 12 of the pole has been reduced. In practice it has been found possible to dispense with a part of the strong tip region of the ferrite material beneath the portion 19 of the element 17 without significant loss of performance. Thus the size, and therefore the cost of the ferrite magnet portion of each pole can be reduced without significant loss of motor performance. It will be noted however that the arcuate length of each pole 11 (the pole arc) is not reduced.

A known problem arising from positioning of the through bolts 21 in respective interpolar spaces is that since the bolts are of ferrous material they can give rise to increased flux in the associated comutating zones (mainly in the interpolar spaces) of the machine which in turn results in increased brush wear. The facility to reduce the arcuate length of the permanent magnet portion 12 of each pole (as shown in FIG. 8) provides a space through which the through bolts 21 can pass. Such an arrangement is shown in FIG. 8 where the portion 18 of each element 17 is split into two parts 18a, 18b between which the through bolt 21 passes. Thus the ferrous material of the through bolt 21 contributes to the total flux carrying material of the portion 18, and of course a compensating adjustment can be made to the thickness of the portion 18. The two parts 18a and 18b of the portion are bridged by an integral third part 18c which continues the air-gap surface of the pole 12. The presence of the through bolts 21 in two of the elements 17 may permit the through bolts 21 to be used to provide a circumferential location for the poles 12. FIG. 9 shows that each portion 18 has a circumferential extension 22 abutting the weak tip end of the next adjacent pole 11 so that the poles 11, by virtue of the extensions 22 define a circumferentially rigid assembly within the yoke 10. Because two through bolts 21 pass through diametrically opposed portions 18 and are anchored at their ends to the end caps of the machine then they will constitute abutments providing circumferential location of the pole assembly within the yoke. Moreover, the extensions 22 contribute flux carrying material to the yoke 10 in the interpolar spaces thus relieving the problem of saturation of the flux carrying material in the critical, interpolar areas of the yoke.

While it is preferable, at least theoretically, for the portion 19 of each element 17 to mate with its respective permanent magnet material along a continuous curved surface, it would be quite possible in practice to grind the ferrite material with a flat surface for engagement by the portion 19, and to provide the portion 19 with a corresponding flat surface 19a. In order that the thickness of the portion 19 would not increase too sharply then then inner surface of the portion 19 would have a second flat surface 19b at a shallow angle to the surface 19a, and such an arrangement is of course ideally suited to a construction wherein the permanent magnet material 12 is shortened and does not occupy the full area beneath the portion 19 of its respective element 17. Such a construction is illustrated in FIG. 10. Also in FIG. 10 the leading edge (the strong tip) of the element 17 is chamferred to provide an increased air gap 23 at this point.

FIG. 11 illustrates a further modification whereby the through bolts 21 may be accommodated. In a construction where the permanent magnet portion 12 of the pole 11 is shortened, without reducing the overall pole arc, the through bolt 21 is positioned within the overall pole arc, but rather than dividing the portion 18 into two parts as in FIG. 9, in the FIG. 11 construction the portion 18 is unitary, and passes between the permanent magnet portion 12 and the through bolt 21. However, an arcuate extension 24 integral with the portions 18 and 19 of the element 17 extends from the portion 18 in the opposite direction to the portion 19, overlying the through bolt 21, and providing the required total pole arc. Thus the extension 21 continues the air gap face of the pole 11 to the required extent.

So far we have only considered constructions where the air gap between the armature 13 and the face of the poles 11 is a parallel air gap. However, when considering an automotive starter motor a critical region of the torque/speed curve of the motor is in the vicinity of torque of 2 Nm. The current required to provide torque at this level is in the range 100 to 200 Amps and thus it is important that the design of the flux shunt (the element 17) provides as small an additionally flux as possible arising from armature energization, in the operating region up to 200 Amps. A convenient way of achieving such control over the performance of the machine is by careful choice of the air-gap between the armature and the poles, particularly over the strong tip portion of the poles. It is likely therefore that the optimum choice of machine design will employ a tapering air-gap at least between the portion 19 of each element 17 and the armature. It is essential to ensure that the increase in air-gap in this region does not become so large as to adversely effect stall torque of the machine. FIG. 12 shows a modification of the arrangement illustrated in FIGS. 5, 6 and 7 in which the air-gap between the ferrite portion 12 of the pole and the armature 13 is constant, but increases progressively in the region between the portion 19 of each element 17 and the armature 13. The degree of air-gap increase in FIG. 12 is exaggerated for the purposes of illustration. It can be seen that at the zero thickness end of the portion 19 the air-gap is equal to that existing between the ferrite portion 12 of each pole and the armature, and that the gap progressively increases, by appropriate shaping of the portion 19, to a maximum at the strong tip of each pole 11.

FIG. 12 also shows the provision of an aluminium liner 25 engaging the air-gap faces of the poles 11, so that the poles 11 are trapped radially between the liner 25 and the yoke 10. The liner 25 is effectively an aluminium cylinder which is swaged or otherwise deformed outwardly in the increased air-gap regions. The liner 25 has no magnetic effect within the machine and thus its provision is of no significance magnetically. A very thin mild steel sleeve (wall thickness 0.2 to 0.3 mm) could be used in place of the aluminium sleeve without significantly affecting the magnetic performance of the machine.

FIGS. 13, 14 and 15 are developed diagrammatic views illustrating the magnetic flux flow within the machine at zero armature current, mid-range armature current, and high armature current respectively. FIG. 13 is a flux plot at zero amps which approximates fairly closely to light running, FIG. 14 corresponds to running in the critical 2 Nm torque range, and FIG. 15 corresponds to the operation at lock (stall torque). It can be seen from FIG. 13 that the elements 17 shunt a very substantial proportion of the flux in the strong tip region of the poles back to the yoke, so that flux crossing the air-gap to the armature in the strong tip region of the poles is minimal. In FIG. 14 it can be seen that there is an increase in the amount of flux flowing in the strong tip regions of the air gap resulting from armature reaction but a proportion of the flux is still being shunted to the yoke by the elements 17. However, in FIG. 15 the whole of the portions 19 of the elements 17 have saturated, and the portions 18 and 19 are contributing flux to the air-gap in the strong tip regions. Thus the shunting of flux in the low load conditions gives an increased low load running speed whereas the contribution to flux in high current conditions gives improved torque.

The foregoing description has concentrated on the use of ferrite permanent magnet material since this is widely available at reasonable cost. However, permanent magnet materials of higher energy content are becoming more readily available, and similar principles to those described above can be utilized in machines employing permanent magnet materials of higher energy content, for example those magnets known generally as rare earth-iron magnets. It is expected that rare earth-iron-boron magnets and rare earth-iron-cobalt-boron magnets will become economic in the very near future, particularly for higher power starter motor applications. Commercially available at present are "NEOMAX" from Sumitomo in Japan, and "MAG-NEQUENCH" from Delco Remy in the United States.

"NEOMAX" is a sintered product based on Neodymium, Iron and Boron, whereas "MAG-NEQUENCH" is a similar, but rapidly quenched alloy which is either plastic moulded, plastic bonded or hot pressed to provide a wide range of operating characteristics. By virtue of their higher energy content less permanent magnet material is needed when producing an equivalent machine utilizing such material. If the overall diameter of the machine is to be maintained equivalent to that of a ferrite magnet machine, and this requirement will usually be present to avoid reduction in size of the interpolar regions and to prevent the proximity of the material of the yoke affecting flux characteristics in the interpolar regions, then the reduction in permanent magnet material can be achieved by reducing the radial thickness of the permanent magnet portions of the poles. FIG. 16 shows such an arrangement, and can be seen that the reduction in radial thickness of the permanent magnet portion 12a of each pole is accommodated by seating the permanent magnet portion 12a on a mild steel support platform 25. The support platform 25 in effect forms part of the yoke 10, and FIG. 13 shows the platforms 25 as parts of a cylindrical member received within the yoke 10 and having the elements 17 formed integrally therewith. The formation of such a component might prove, in practical terms, to be too complex, and if this is the case then clearly it can be formed as a series of circumferentially separate components located in position relative to one another when housed in the yoke 10. Naturally an increase in the thickness of the elements 17 will be needed to enable them to shunt the higher levels of flux from the higher energy magnets.

FIG. 17 is a view similar to FIG. 7 but showing the inclusion of pole fixing clips 31. In a four pole machine there will be four clips 31 which desirably are formed from spring steel, but which may be formed from a suitable synthetic resin material. Each clip 31 lies in a respective interpolar space, and is of generally channel-shaped transverse cross-section with the length of the channel extending parallel to the axis of the machine. The base part of the channel of each clip engages the interior of the yoke 10, and at their free ends both limbs of each clip 31 are turned outwardly to overlie respectively the weak tip end of the permanent magnet material of one pole, and the portion 18 of the shunt element 17 of the next adjacent pole. During fitting of the clips the limbs are flexed towards one another so that in use they press outwardly against the poles and thus load the poles both circumferentially, and radially outwardly. Thus the poles are held circumferentially relative to one another by the clips, and are pressed outwardly against the interior of the yoke. Two of the clips, positioned diametrically opposite one another, will accommodate within their channel the respective end cap retaining through bolts 21 and although not shown in FIG. 17 these clips can be arranged to grip the through bolts 21 so that the through bolts 21 provide a circumferential location, within the yoke 10, for the assembly of poles and clips, the through bolts thus preventing circumferential movement of the assembly of poles and clips relative to the yoke. If desired a similar circumferential location can be provided at the clips 31 which do not embrace the through bolts by providing radially inwardly extending posts on the yoke 10 which locate in corresponding apertures in the base regions of the clips. The mechanical linking of the clips 31 to the yoke by means of posts on the yoke passing through apertures in the base walls of the clips will of course additionally provide an axial location of the assembly of poles and clips relative to the yoke 10.

FIG. 18 is a view similar to FIG. 11, but in the case of FIG. 18 the poles 11 are secured in position in the yoke 10 by securing the yoke engaging end of the portion 18 of each shunt to the yoke, as by welding (indicated at 32). As an alternative to welding a securing screw or screws could be introduced through the material of the yoke 10 and into the portion 18 of each element 17, and it will be recognised that the portion 19 of each element 17, in overlying the permanent magnet material 12 of the pole will trap the permanent magnet material against the inner surface of the yoke 10. Conveniently some form of location at the weak tip end of each pole will be provided, and in FIG. 18 there is indicated a protrusion 33 extending radially inwardly from the yoke 10 and engaging the weak tip end of the permanent magnet material 12 of each pole 11.

As an alternative, in FIG. 18, to welding or screwing the portions 18 to the yoke 10 the portions 18 could be rivetted to the yoke by rivet members integral with the portions 18 and passing through preformed apertures in the wall of the yoke to be rivetted over at the exterior of the yoke. The projections 33 can be formed in any convenient manner but it is convenient to form them by semi-shearing the material of the yoke 10 at appropriate points. It will be recognised that the elements 17 and the protrusion 33 thus provide a circumferential and radial location of each pole relative to the yoke 10, and the poles can be located axially by protrusions on the end caps of the machine which engage opposite axial ends of the poles 11 or by means of spring clips or the like interposed between the axial ends of the poles and their respective end caps. It probably would not be convenient to form the protrusions 33 after introduction of the poles, and thus the protrusions 33 would be formed during manufacture of the yoke, and the poles would then be inserted axially into the yoke and the portions 18 of the shunt elements 17 would be appropriately secured to the yoke.

Where the permanent magnet material 12 is a ferrite material it is preferred that the portions 19 of the shunt shall be inset into the air gap face of the permanent magnet material so that the air gap face of each portion 19 continues the desired air gap profile of the pole. Thus where a parallel air gap arrangement is desired the permanent magnet material will be cut away to accommodate the tapering portion 19 of the respective elements 17 in such a manner that the face of the portion 19 presented to the air gap maintains the desired parallel air gap. Similarly, where a tapering air gap is required the taper angle of the ferrite material of the pole will be increased in that region which is engaged by the portion 19 of an element 17 by an amount such that the air gap face of the portion 19 defines one side of the desired tapering air gap.

FIG. 19 illustrates a pole 11 including an element 17 wherein the portion 19 tapers in width (the dimension measurement in the axial direction of the machine) and also in thickness. The taper in width and in thickness is so chosen that the cross-sectional area of the portion 19 increases linearly from a minimum (desirably zero) at the free end of the portion 19 over that extent of the portion 19 which overlies permanent magnet material. In FIG. 19 it can be seen that the insetting of the portion 19 into the permanent magnet material 12 is achieved by producing the permanent magnet portion of the pole 11 with a recess in its air gap face which is shaped closely to receive the portion 19 of the element 17. In other words the recess in the permanent material is an image of the portion 19.

However, FIG. 20 illustrates an alternative form of insetting in which the permanent magnet material tapers in thickness from a maximum adjacent its circumferential mid-point to a minimum at its strong tip end, and over its whole width (the dimension measured parallel to the axis of the machine). The angle of taper is chosen in relation to the angle of taper of the thickness of the portion 19 of the associated element 17 so as to preserve the desired air gap between the portion 19 and the rotor of the machine, but it will be recognised that there is a much increased air gap between the permanent magnet material and the rotor of the machine in those regions "X" and "Y" on opposite sides of the portion 19. Nevertheless, the portion 19 can still be considered to be inset into the permanent magnet material since permanent magnet material has been removed to accommodate the portion 19 while still preserving the desired air gap between the pole face defined by the portion 19 and the rotor of the machine.

It has been mentioned previously that the present invention is not restricted to motors. Similar principles can be applied in generators. A conventional d.c. generator, for automotive use, equipped with permanent magnet poles embodying elements 17 as described above, would be able to provide a constant voltage characteristic irrespective of the load current since the change in flux with current could be arranged to provide additional voltage at higher load currents thereby balancing the voltage drop arising from the resistance in the machine windings. Such an arrangement may be useful for a small, constant speed, petrol or diesel engine generator where, usually, conventionally wound fields must be used in order to provide the necessary voltage regulation.

In all of the examples described above the permanent magnet material of each pole is homogeneous. It should be noted however that shunt element 17 as described can be utilized in conjunction with dual or multigrade permanent magnet material. Thus a ferrite based pole may incorporate two or more different grades of ferrite material in chosen regions of the permanent magnet portion of the pole.

A preferred material for the elements 17 is low carbon steel with a small percentage inclusion of silicon. The elements 17 can be formed by extrusion or rolling and then cutting to length, by forging primarily cold forging, or by powder sintering. Where an element 17 is formed from low carbon steel powder by sintering it may be desirable to treat the sintered product to improve its density and therefore its saturation flux density, at least in chosen regions thereof.

The foregoing description assumes dynamo electric machines where the brushes of the commutator arrangement are located at geometric neutral positions rather than at magnetic neutral positions. It will be recognised therefore that in a machine employing "brush advance" to enhance commutation there is a corresponding move in the magnetic centre line of each pole.

I claim:

1. A unidirectional, permanent magnet, direct current, rotary dynamo electric machine comprising a stator, a rotor rotatable relative to the stator and having an air gap between the rotor and the stator, the permanent magnet poles of the machine each including a flux shunt comprising first and second magnetically continuous portions formed from a material of high saturation flux density, each first portion extending from the back iron, upon which its respective pole is mounted, towards the air gap of the machine and being magnetically continuous with the back iron, each first portion being adjacent that end of its respective permanent magnet which is the strong tip end in use and having its end remote from the back iron magnetically continuous with the respective shunt second portion, each shunt second portion extending from the respective shunt first portion circumferentially of the machine towards that end of the respective permanent magnet which is the weak tip end in use, and engaging the air gap face of the respective permanent magnet each second portion in that region thereof which is engaged with the respective permanent magnet being shaped such that its cross-sectional area increases substantially linearly from a minimum at its free end, each shunt first portion having a minimum cross sectional area equal to or greater than the maximum cross sectional area of the respective second portion, and each shunt extending over a maximum of 80% of the pole arc of its respective pole from the strong tip end thereof wherein the circumferential dimension and the positioning of the permanent magnet of each pole is such in relation to the overall pole arc that a gap is defined between the first portion of each shunt and the adjacent end of the respective permanent magnet, wherein the poles are carried by the stator and a, or each, through bolt of the machine is accommodated in said gap of a respective pole.

2. A machine as claimed in claim 1 wherein the permanent magnet material of said poles is ferrite material.

3. A machine as claimed in claim 1 wherein the permanent magnet material of said poles is a rare earth iron material.

4. A machine as claimed in claim 1 wherein the shunt second portions are inset in the airgap face of their respective permanent magnets.

5. A machine as claimed in claim 3 wherein the respective shunt second portions are seated on the airgap faces of the permanent magnets.

6. A machine as claimed in claim 4 wherein the shunt second portions have a reduced axial dimension by comparison with the respective shunt first portions.

7. A machine as claimed in claim 1 wherein the respective shunt first portion is bifurcated to accept the through bolt.

8. A machine as claimed in claim 1 wherein the circumferential dimension of the permanent magnet of each pole together with the thickness of the respective shunt first portion is less than the required pole arc and the shunt has an extension extending in the opposite circumferential direction to the shunt second portion to provide the required pole arc.

9. A machine as claimed in claim 1 wherein the stator carries the permanent magnet poles, the rotor has a wound armature and the taper of the second portions of the shunts is such that when no current flows in the windings of the armature, the flux density within the shunt second portions, over substantially the whole of each pole arc, is at or near the "knee" of the saturation curve of the shunt material.

10. A machine as claimed in claim 1 wherein the poles are retained in position relative to the back iron by means of a metal tube lying in the airgap between the rotor and the stator.

11. A machine as claimed in claim 1 wherein the poles are retained in position relative to the back iron by means of spring clips received in the interpolar spaces.

12. A machine as claimed in claim 3 wherein the permanent magnets of the poles are supported on radial platforms.

13. A unidirectional, permanent magnet, direct current, rotary dynamo electric machine comprising a stator, a rotor rotatable relative to the stator and having an air gap between the rotor and the stator, the permanent magnet poles of the machine each including a flux shunt comprising first and second magnetically continuous portions formed from a material of high saturation flux density, each first portion extending from the back iron, upon which its respective pole is mounted, towards the air gap of the machine and being magnetically continuous with the back iron, each first portion being adjacent that end of its respective permanent magnet which is the strong tip in the use and having its end remote from the back iron magnetically continuous with the respective shunt second portion, each shunt second portion extending from the respective shunt first portion circumferentially of the machine towards that end of the respective permanent magnet which is the weak tip end in use, and engaging the air gap face of the respective permanent magnet each second portion in that region thereof which is engaged with the respective permanent magnet being shaped such that its cross-sectional area increases substantially linearly from a minimum at its free end, each shunt first portion having a minimum cross sectional area equal to or greater than the maximum cross sectional area of the respective second portion, and each shunt extending over a maximum of 80% of the pole arc of its respective pole from the strong tip end thereof, wherein the permanent magnet material of said poles is a rare earth iron material, the permanent magnets of the poles are supported on radial platforms and wherein the platforms and the shunts and integral parts of a common ferromagnetic member.

14. A machine as claimed in claim 13 wherein the permanent magnet material of said poles is ferrite material.

15. A machine as claimed in claim 13 wherein the shunt second portions are inset in the airgap face of their respective permanent magnets.

16. A machine as claimed in claim 15 wherein the respective shunt second portions are seated on the airgap faces of the permanent magnets.

17. A machine as claimed in claim 16 wherein the shunt second portions have a reduced axial dimension by comparison with the respective shunt first portions.

18. A machine as claimed in claim 13 wherein the respective shunt first portion is bifurcated to accept the through bolt.

19. A machine as claimed in claim 13 wherein the circumferential dimension of the permanent magnet of each pole together with the thickness of the respective shunt first portion is less than the required pole arc and the shunt has an extension extending in the opposite circumferential direction to the shunt second portion to provide the required pole arc.

20. A machine as claimed in claim 13 wherein the stator carries the permanent magnet poles, the rotor has a wound armature and the taper of the second portions of the shunts is such that when no current flows in the windings of the armature, the flux density within the shunt second portions, over substantially the whole of each pole arc, is at or near the "knee" of the saturation curve of the shunt material.

21. A machine as claimed in claim 13 wherein the poles are retained in position relative to the back iron by means of a metal tube lying in the airgap between the rotor and the stator.

22. A machine as claimed in claim 13 wherein the poles are retained in position relative to the back iron by means of spring clips received in the interpolar spaces.

23. A machine as claimed in claim 12 wherein the platforms and the shunts are integral parts of a common ferromagnetic member.

* * * * *